Aug. 25, 1964 W. A. HOYER ETAL 3,146,351
PULSE TRANSFORMER FOR WELL LOGGING DEVICE
Filed Dec. 21, 1960

INVENTORS.
WILMER A. HOYER,
ROY B. ADAMS,
THOMAS W. ADAIR, III,
BY
John D. Schneider
ATTORNEY.

3,146,351
PULSE TRANSFORMER FOR WELL LOGGING DEVICE
Wilmer A. Hoyer, Houston, Tex., Roy B. Adams, Baltimore, Md., and Thomas W. Adair III, Houston, Tex., assignors, by mesne assignments, to Jersey Production Research Company, Tulsa, Okla., a corporation of Delaware
Filed Dec. 21, 1960, Ser. No. 77,401
2 Claims. (Cl. 250—87)

This invention relates to radioactivity well logging, in general, and in particular to neutron generating apparatus used to produce a stream of neutrons used to bombard subsurface formations. More particularly, it concerns the transformer component of the power supply of a well logging neutron generator.

In radioactive well logging, characteristics of subsurface formations may be investigated by measuring artificially induced radiation resulting from neutron bombardment of the subsurface formations. A particular application of the detection of induced radiation involves timing bursts of neutrons used to bombard the subsurface formations and also the periods of detection of radiation induced by the bombarding neutrons, as described in U.S. patent application Serial No. 652,801, by Muench et al., filed April 15, 1957, entitled "Method of Nuclear Borehole Logging," is now abandoned.

One type of particle accelerator used to generate neutrons in this manner of well logging uses a tritium-containing target to which accelerated deuterium ions are directed, the ions being generated by charging deuterium gas to a radio frequency field. Neutrons are emitted when the high speed deuterium ions react with the tritium in the target. A well logging neutron generator of this type is shown and described in U.S. patent application Serial No. 746,520, by Muench et al., filed July 3, 1958, entitled "Radiation Logging Device," now Patent No. 2,998,523, issued August 29, 1961.

The power supply for generating bursts of high-energy neutrons in this radioactivity well logging technique must have the following characteristics. It must be small enough to be confined in a well logging tool; i.e., it must be at least small enough to be packaged within a 3¾ in. I.D. housing; it must not require more than 300 watts to operate the neutron generator for all of the electrical power required must be transmitted through a very small diameter cable, and a maximum of only 300 to 350 watts of power is available at the logging tool; it must not generate excessive amounts of heat, because the existing heat represents wasted power, and also the heat initially produces failure in components of the power supply; and it must produce about a 5 microsecond, 100 kilovolt pulse.

Ordinary common transformers cannot produce 100 kilovolts and at the same time satisfy the other above-stated requirements. However, these requirements are satisfied by the apparatus of this invention, which in brief comprises a pulse transformer for use in the power supply of a radioactivity well logging tool designed to bombard subsurface formations with bursts of neutrons, wound on a small core in a manner such that the primary and secondary coils are separated and spaced apart from each other. Each coil is wound in a multilayered fashion, and high quality dielectric material is used for insulation between each layer or winding. The core, which is preferably one inch in cross section, is formed of a material, e.g., ferrite, which has high permeability, relatively high field saturation, and low core loss at the operating pulse frequency. The transformer is encased in a medium of gaseous sulfur hexafluoride (SF$_6$) which has a very high voltage breakdown strength and a dielectric constant of unity. This arrangement reduces corona, which causes loss and eventual breakdown due to overheating of the dielectric material and minimizes the capacity between the windings which reduces the load of the 100,000 volt power supply. Among the advantages achieved by separation of the primary and secondary coils are reduction of the capacity between the coils which reduces the losses of charging this capacity; better heat dissipation because more surface is exposed to the hexafluoride gas; better insulation effected by the hexafluoride gas by the more open windings of the coils; and substantial reduction in the size of the transformer while maintaining a suitable turns ratio.

A main object of the present invention therefore is to provide an improved power supply for radioactivity well logging instrumentation.

This and other objects and advantages of the invention will be apparent from a more detailed description thereof when taken in conjunction with the drawings in which.

Figure 1:
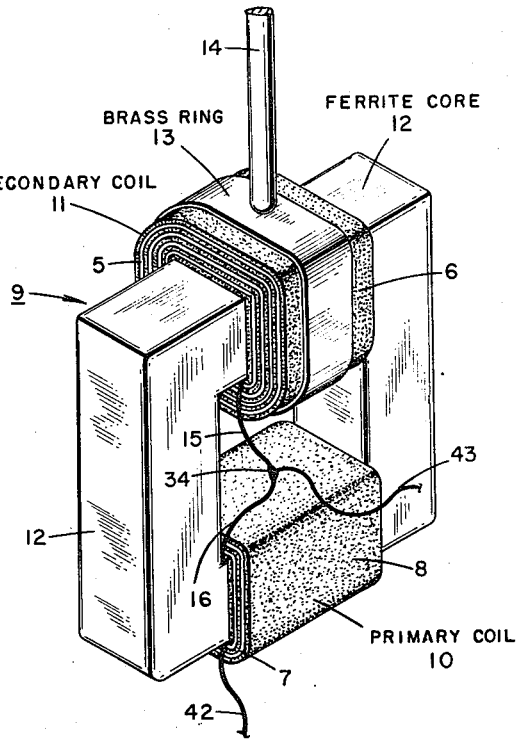
FIG. 1 is as isometric view of the transformer.

Referring to the drawings in greater detail, as shown in FIG. 1 the high voltage transformer 9 consists of a primary coil 10 and a secondary coil 11 wound in a multi-layered manner on a one-inch square in cross section ferrite core 12, e.g., a ferrocube 1F 5–3C, and arranged separated and spaced from each other as shown. A thin brass ring 13 is in contact with an output probe 14 and surrounds coil 11, which preferably is formed of 2,000 turns of No. 32 B & S windings 5 between each layer of which insulation 6 is provided. Coil 10 preferably is formed of 110 turns of No. 20 B & S windings 7 between each layer of which insulation 8 is provided. Insulation 6 and 8 is high dielectric material such as Mylar, irradiated Teflon, Teflon or other high temperature, low dielectric-loss material. Common terminal 34 connects input lead 15 of secondary coil 11 and output lead 16 of primary coil 10. A lead 42 is connected to the grounded side of coil 10, and a lead 43 connects to terminal 34.

Figure 2:
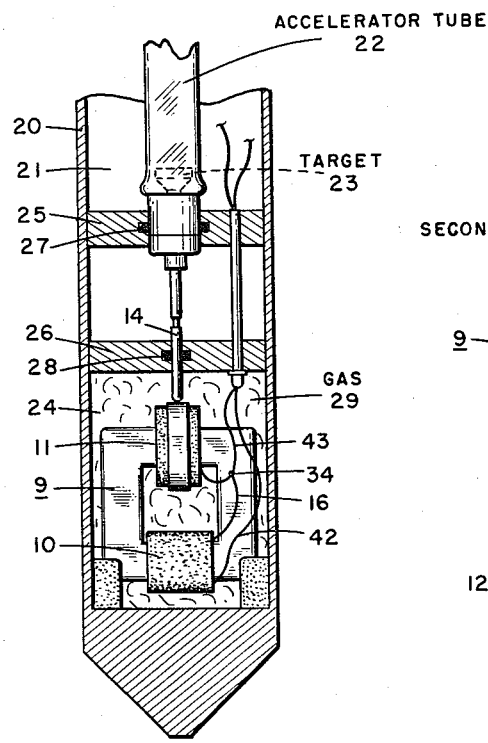
FIG. 2 is a vertical, partly-sectional view of the manner of arrangement of the transformer in a well logging tool.

In FIG. 2 the transformer 9 of FIG. 1 is shown as part of a particle accelerator type neutron generator for use in wells. This apparatus includes a housing 20 provided with an upper neutron generator section 21 containing an accelerator tube 22 in which is arranged a tritium target 23. This section is sealingly separated from a lower power generating section 24 in which is arranged transformer 9 by plate members 25 and 26 and seals 27 and 28. Target 23 is connected to brass ring 13 by means of probe 14. Transformer 9 is surrounded by insulating hexafluoride gas 29 under a pressure of 80 p.s.i. The particle accelerator apparatus is described in greater detail in U.S. patent application Serial No. 746,520, noted supra.

In the preferred well logging use of the transformer as illustrated in FIGS. 1 and 2, energy is stored in the transformer which is arranged in a pulse producing network in which capacitive pulse-forming means is periodically charged from a D.C. source and discharged through the primary of the transformer. This energy is utilized to charge an auxiliary capacitor after production of the desired output pulse. The auxiliary capacitor is connected in the circuit in such a way as to aid the D.C. source in subsequent charging of the pulse transforming network.

Figure 3:
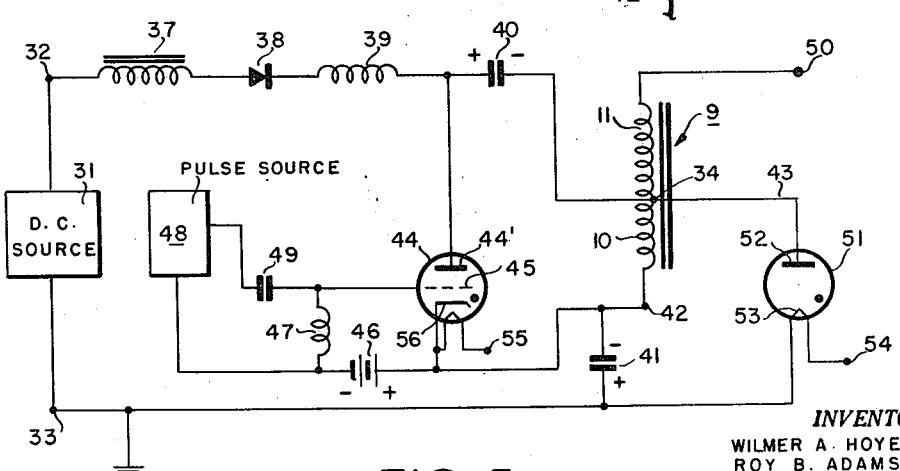
FIG. 3 is a schematic diagram illustrating a desired use of the transformer.

A preferred use of the transformer is illustrated by the circuit of FIG. 3. In this figure, which is also shown and described in U.S. Patent No. 2,907,900, entitled "Pulse Generator," by Hoyer et al., issued October 6, 1959, is shown a direct current source 31 having a positive output terminal 32 and a negative output terminal 33. Terminal 32 is coupled to one terminal 34 of the primary coil 10 of the high voltage output transformer 9, through series connected inductor 37, half-wave rectifier 38, radio frequency choke 39, and storage capacitor 40. Half-wave rectifier 38 is poled to permit current flow from terminal 32 to terminal 34. A capacitor 41 couples the other terminal 42 of primary coil 10 to negative terminal 33 of D.C. source 31. The capacity of capacitor 41 is greater than that of capacitor 40, preferably at least 50 times greater. Capacitor 40 is utilized to store energy from D.C. source 31 for subsequent discharge through coil 10. Inductor 37 in combination with capacitor 40 produces a charging current for capacitor 40 of an oscillatory nature so that the peak voltage to which capacitor 40 may be charged is approximately twice the output voltage of D.C. source 31.

The function of radio frequency choke 39 is to isolate high frequency oscillations from diode 38 and inductor 37. Diode 38 prevents the discharge of energy in capacitor 40 through inductor 37, D.C. source 31, radio frequency choke 39, and coil 10. Therefore, capacitor 40 will remain charged to the peak voltage that appears across it. For the purpose of discharging capacitor 40 through coil 10, there is provided a low resistance electronic switch, thyratron 44. Plate 44' of thyratron 44 is connected to the common terminal of capacitor 40 and inductor 39. The thyratron grid 45 is normally biased to cut off by C-voltage source 46, which is coupled to grid 45 by radio frequency choke 47 in the usual manner. A control pulse source 48 coupled to grid 45 by a capacitor 49 is utilized to fire the thyratron at periodic intervals, and it may be a relaxation oscillator of conventional design. Output voltages appearing between transformer secondary output terminal 50 and ground are coupled to the high voltage terminal (probe 14) of a particle accelerator, as shown in FIGS. 1 and 2. A half-wave rectifier 51, shown as a gas diode, is connected between capacitor 41 and terminal 34 so that conduction therethrough will be obtained when terminal 34 is more positive with respect to terminal 42 than is terminal 33. More specifically, plate 52 of rectifier 51 is connected to terminal 34, and cathode 53 is connected to capacitor 41. While plate 52 is shown connected to tap 34, it may be connected to a tap on coil 10 or coil 11 of transformer 9. Heating power for the cathode 53 and the heater of thyratron 44 is supplied from separate terminals 54 and 55, respectively.

The operation of the circuit of FIG. 3 is as follows: Assuming that control pulse source 48 is functioning to provide voltage pulses sufficient to bias thyratron 44 to conduction at a repetition rate of 1,000 p.p.s., D.C. source 31, which may have an output voltage of about 1,200 volts is now activated, and capacitor 40 will begin charging. The presence of inductor 37 in the circuit causes the voltage across capacitor 40 to rise to approximately twice the voltage supplied by D.C. source 31. As soon as the voltage across capacitor 40 has reached a peak and the capacitor begins to discharge back through the loop including radio frequency choke 39, inductor 37, D.C. source 31, capacitor 41, and coil 10, rectifier 38 will function to prevent the flow of current around the loop. Capacitor 41 will have a very small charge with terminal 42 positive with respect to source terminal 33. When control pulse source 48 renders thyratron 44 conducting, capacitor 40 will be discharged through coil 10, and an output pulse will appear at terminal 50. Terminal 34 will be negative with respect to terminal 42 so that rectifier 51 will not conduct. Because of the capacitance of the load and capacitance in coils 10 and 11, the flow or current through coil 10 will set up a ring or oscillatory current so that terminal 34 in due course swings positive with respect to terminal 42. Current conduction through thyratron 44 will cease. As soon as the voltage at terminal 34 swings positive with respect to terminal 42, rectifier 51 will be rendered conductive so that capacitor 41 will charge to the polarity indicated. Capacitor 40 will begin charging and will draw its charge both from D.C. source 31 and capacitor 41, since D.C. source 31 and capacitor 41 are in series with the voltages thereacross adding. The voltage across capacitor 40 may reach a peak of about 6,000 volts when 1,200 volts are supplied by D.C. source 31. The charging current through coil 10 is quite small relative to the discharge current from capacitor 40 through coil 10 and thyratron 44. Therefore, the output voltage at terminal 50 produced by the charging current through coil 10 will be negligibly small.

During the next charging and discharging cycle the voltage at plate 44' of the thyratron will drop to a voltage slightly positive with respect to the voltage at cathode 56 so that conduction will be maintained through the thyratron. A large current pulse will flow through the thyratron. The voltage at terminal 34 will slowly rise until the output voltage at terminal 50 reaches an extreme negative value. During this time the voltage at plate 44' of the thyratron will remain substantially constant. As soon as the voltage at terminal 50 starts swinging to a less negative value, there will be a sudden downward kick in the voltage at terminal 34 and in the voltage at the plate of the thyratron. The sudden increase in the magnitude in the negative voltage at the plate of the thyratron is sufficient to extinguish the thyratron. The voltage at the plate of the thyratron quickly rises to about +1,200 volts. As soon as terminal 34 swings sufficiently positive with respect to terminal 33 to bring about conduction through rectifier 51, capacitor 41 will begin charging. As soon as capacitor 41 has finished charging, the voltage at terminal 34 will drop to about −1,800 volts (the voltage across capacitor 41 when it is charged) and will remain at substantially this value until the next firing of thyratron 44. After one oscillation, the voltage at terminal 50 remains relatively consistent until thyratron 44 again fires.

Having fully described the elements, nature, objects, and operation of our invention, we claim:

1. Apparatus for use in the power supply of a radioactivity well logging tool designed to bombard subsurface formations with bursts of high energy neutrons comprising:

a sealed housing;

a pulse transformer arranged in said housing, said transformer including a closed ferrite core of high permeability, relatively high field saturation and low core loss at the operating pulse frequency and formed about 1 inch in cross section;

primary and secondary coils wound in a multilayered manner on opposite sides of said core, said coils being separated and spaced apart from each other;

the turns of said primary and secondary coils being in a ratio of 1:20 with the primary containing about 110 turns;

insulation comprising high quality dialetic material arranged between each layer of the windings of each coil;

sulfur hexafluoride gas under pressure located in said housing and surrounding said transformer;

neutron generating means coupled to the output terminal of said secondary coil; and an electrical circuit for pulsing said transformer coupled to the input terminal of said secondary coil and to the output and input terminals of said primary coil.

2. Apparatus for use in the power supply of a radioactivity well logging tool designed to bombard subsurface formations with bursts of high energy neutrons comprising: a sealed housing; a pulse transformer capable of producing 100 kilovolts arranged in said housing, said transformer including a closed ferrite core of high permeability, relatively high field saturation and low core loss at the operating pulse frequency and formed about 1 inch in cross section; primary and secondary coils wound in a multilayered manner on opposite sides of said core, said coils being separated and spaced apart from each other, the turns of said primary and secondary coils being in a ratio of 1:20 with the primary containing about 110 turns; insulation comprising high quality dielectric material arranged between each layer of the windings of each coil; sulfur hexafluoride gas under about 80 pounds' pressure located in said housing and surrounding said transformer; neutron generating means coupled to the output terminal of said secondary coil; and an electrical circuit for pulsing said transformer coupled to the input terminal of said secondary coil and to the output and input terminals of said primary coil.

References Cited in the file of this patent

UNITED STATES PATENTS

| | | |
|---|---|---|
| 2,521,513 | Gray | Sept. 5, 1950 |
| 2,692,978 | Galt | Oct. 26, 1954 |
| 2,756,368 | Gross et al. | July 24, 1956 |
| 2,774,807 | Whitman | Dec. 18, 1956 |
| 2,867,728 | Pollock | Jan. 6, 1959 |
| 2,906,979 | Bozorth | Sept. 29, 1959 |

OTHER REFERENCES

Kilham et al.: Transformer Miniaturization Using Fluorochemical Liquids and Conduction Technique, Proceedings of the IRE, April 1956, pp. 515–520.